Oct. 17, 1933.    K. PETER ET AL    1,931,033
AUTOMOBILE JACK
Filed May 13, 1932
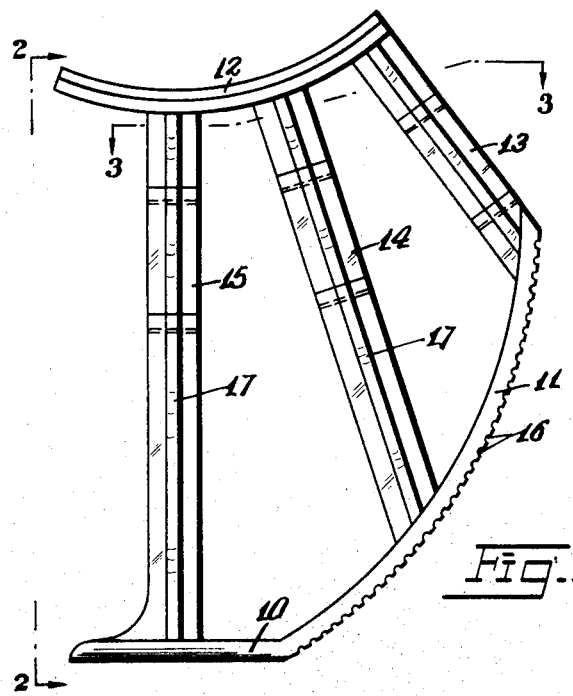
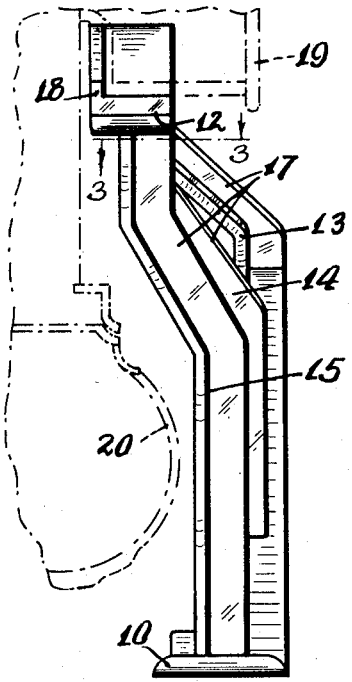
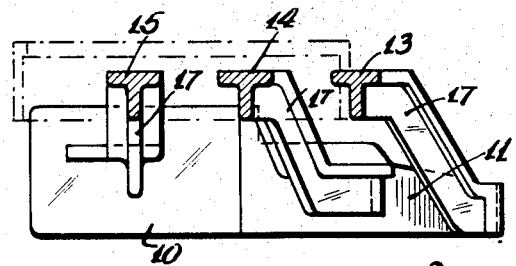
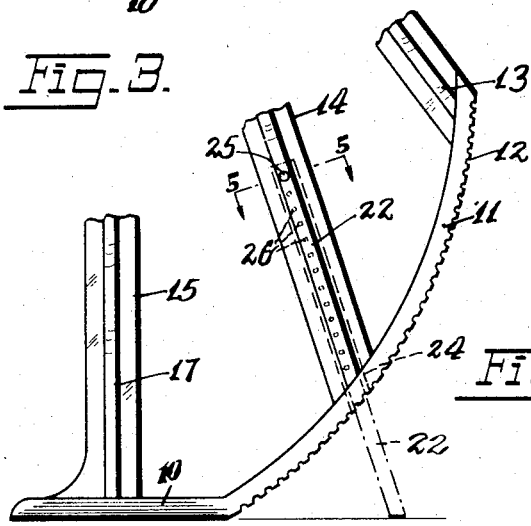
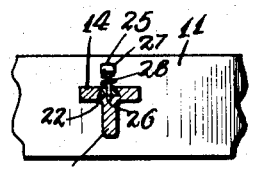
INVENTORS
KURT PETER
ELI S. SCHNEIDERMAN
ARTHUR BERKNER
BY
ATTORNEY Patented Oct. 17, 1933

1,931,033

UNITED STATES PATENT OFFICE 1,931,033

AUTOMOBILE JACK

Kurt Peter, Eli S. Schneiderman, and Arthur Berkner, Clifton, N. J.

Application May 13, 1932. Serial No. 611,160

4 Claims. (Cl. 254—94)

This invention relates to new and useful improvements in a vehicle jack.

The invention has for an object the construction of a vehicle jack which is characterized by a shoe portion having a straight section and a curved section constructed in a manner so that a vehicle may back up against the jack and such movement cause the rolling of the jack into a position in which the vehicle is raised.

The invention has for a still further object the arrangement of a shoulder portion upon said jack for engaging preferably beneath the brake drum on a vehicle.

Furthermore, as another object a plurality of arms are proposed to be arranged between the shoe portion and the shoulder portion for holding these parts together in fixed relation.

Another one of the objects of this invention is the construction of the rigid arms of a cross section to give them great rigidity and of a shape so as to avoid interference with the tire of the vehicle.

Furthermore, the invention also proposes the provision of a means for resisting lowering of the vehicle jack as it assumes a position in which the car is elevated.

Another one of the objects of this invention is the construction of a device of the class described which is of simple, durable construction, dependable in use and efficient in operation and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a side elevational view of a vehicle jack constructed according to this invention.

Fig. 2 is an edge elevational view of Fig. 1, with dot and dash lines showing a portion of a vehicle engaged on the jack.

Fig. 3 is a horizontal sectional view taken on the line 3—3 of Fig. 2.

Fig. 4 is a fragmentary view similar to a portion of Fig. 1 but illustrating a modification.

Fig. 5 is a sectional view taken on the line 5—5 of Fig. 4.

The vehicle jack, comprises a shoe portion consisting of a straight section 10 for resting upon the ground to hold a vehicle elevated and a curved section 11 extending from the straight section 10 for lowering on the ground as a vehicle backs up upon the jack to be elevated. A shoulder portion 12 for engagement beneath the brake drum or similar part of a vehicle is spaced from the shoe portion and held in position by a plurality of rigid arms 13, 14 and 15. Preferably, all of these parts of the jack should be made from one piece by casting or forging. The outer side of the curved section 11 is formed with a plurality of serrations 16 so that the jack grips the ground when a vehicle moves backwards on to it. Each of the rigid arms 13, 14 and 15 are provided with reinforcement ribs 17 so as to form a rigid construction.

The shoulder portion 12 of the jack is provided with a flange 18 adapted to act against the bend of a vehicle brake drum, which drum is indicated on the drawing by reference numeral 19. A wheel, also indicated by dot and dash lines, is shown connected with the drum 19 and bears reference numeral 20. The arms 13, 14 and 15 are bent, as clearly shown in Fig. 2 so as to avoid interference with the tire of the wheel 20. The straight section 10 of the shoe portion of the vehicle is enlarged, clearly shown in Figs. 2 and 3, so as to provide a foot for resting upon the ground.

The arm 13 is the shortest, the arm 14 of intermediate length, and the arm 15 of greatest length so that the jack may be placed beneath a vehicle for the jacking up thereof. It can easily be visualized that the narrow part of the jack is placed beneath the vehicle and as the vehicle moves back on to the jack it rolls along the curved section 11 and conveniently stands upon the straight section 10. The car may be removed from the jack by merely shoving it off so as to cause the jack to roll upon the curved section 11.

In Figs. 4 and 5 a modification of the invention has been disclosed in which provision has been made for restraining rolling of the jack from a position in which the vehicle is raised to a position in which it is lowered, said means being constructed so as to be retractable to allow the lowering when desired. In detail, this means comprises a rod 22 slidibly engaged upon one of the arms, specifically arm 14 of the jack and extendible, as indicated by the dot and dash lines 23. The rod 22 engages in a dove-tailed groove in the side of the arm 14 and passes through an aperture 24 in the curved section 11 so as to be extendible. A catch 25 is mounted upon the rod 22 and adapted to engage in any one of a plurality of apertures 26 formed along the groove so that the rod may assume various extended positions. The catch 25 comprises a peg 27 urged inwards by a spring 28 acting between the head of the peg and the rod 22 and adapted to engage in any of the apertures 26.

While we have shown and described the preferred embodiment of our invention, it is to be understood that we do not limit ourselves to the precise construction herein disclosed and the right is reserved to all changes and modifications coming within the scope of the invention as defined in the appended claims.

Having thus described our invention, what we claim as new, and desire to secure by United States Letters Patent is:—

1. A vehicle jack, comprising a shoe portion consisting of a straight section for resting upon the ground and a curved section for rolling upon the ground, a shoulder portion for engaging beneath the brake drum or other part of the vehicle and spaced from said shoe portion in a manner so that at one end the parts are close together and at the other end spaced far apart, and rigid arms between the shoe portion and shoulder portions for holding the parts in relation, and means for restraining lowering on said curved section when the jack supports the vehicle and is supported on its straight section, comprising an extendible element on the curved section adapted to engage against the ground and act as a foot.

2. A vehicle jack, comprising a shoe portion consisting of a straight section for resting upon the ground and a curved section for rolling upon the ground, a shoulder portion for engaging beneath the brake drum or other part of the vehicle and spaced from said shoe portion in a manner so that at one end the parts are close together and at the other end spaced far apart, rigid arms between the shoe portion and shoulder portions for holding the parts in relation, and means for restraining lowering on said curved section when the jack supports the vehicle and is supported on its straight section.

3. A vehicle jack, comprising a shoe portion consisting of a straight section for resting upon the ground and a curved section for rolling upon the ground, a shoulder portion for engaging beneath the brake drum or other part of the vehicle and spaced from said shoe portion in a manner so that at one end the parts are close together and at the other end spaced far apart, rigid arms between the shoe portion and shoulder portions for holding the parts in relation, and means for restraining lowering on said curved section when the jack supports the vehicle and is supported on its straight section, comprising a rod slidably mounted upon one of said arms and adapted to be extended for acting against the ground, and means for holding said rod in various extended positions.

4. A vehicle jack, comprising a shoe portion consisting of a straight section for resting upon the ground and a curved section for rolling upon the ground, a shoulder portion for engaging beneath the brake drum or other part of the vehicle and spaced from said shoe portion in a manner so that at one end the parts are close together and at the other end spaced far apart, rigid arms between the shoe portion and shoulder portions for holding the parts in relation, and means for restraining lowering on said curved section when the jack supports the vehicle and is supported on its straight section, comprising a rod slidably mounted upon one of said arms and adapted to be extended for acting against the ground, and means for holding said rod in various extended positions, comprising a catch on the rod engageable with apertures upon one of the rigid arms.

KURT PETER.
ELI S. SCHNEIDERMAN.
ARTHUR BERKNER.